Figure 1:
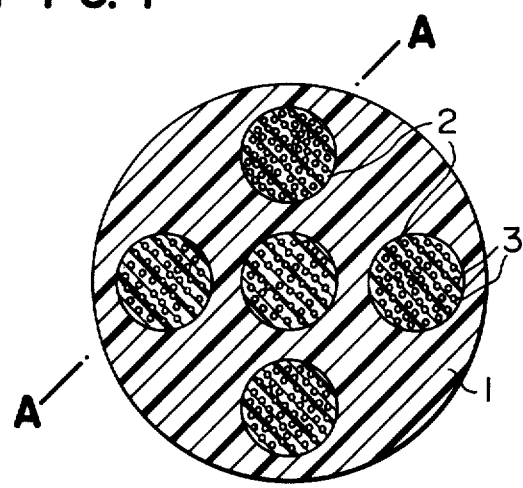

United States Patent [19]

Tazaki et al.

[11] 4,169,186
[45] Sep. 25, 1979

[54] MOLDING MATERIAL STRUCTURE

[75] Inventors: Kichiya Tazaki, Yokohama; Tamotsu Tahara, Oumiya; Akihiro Wada, Inagi; Yukihisa Mizutani, Kawasaki, all of Japan

[73] Assignee: Asahi-Dow Limited, Tokyo, Japan

[21] Appl. No.: 896,433

[22] Filed: Apr. 13, 1978

[51] Int. Cl.$^2$ .................. B32B 5/16; B32B 17/04; D02G 3/00
[52] U.S. Cl. .................... 428/406; 428/293; 428/378; 428/392; 428/403; 428/407
[58] Field of Search ............ 428/375, 378, 392, 293, 428/403, 404, 406, 407, 402

[56] References Cited

U.S. PATENT DOCUMENTS

| | | | |
|---|---|---|---|
| 2,877,501 | 3/1959 | Bradt | 428/372 X |
| 3,395,530 | 8/1968 | Campbell | 428/375 X |
| 3,660,974 | 5/1972 | Marzocchi et al. | 428/378 X |
| 3,671,378 | 6/1972 | Baer et al. | 428/378 X |
| 3,671,384 | 6/1972 | Baer et al. | 428/378 |
| 3,709,773 | 1/1973 | Hall | 428/375 |
| 4,037,011 | 7/1977 | Hattori et al. | 428/392 |

Primary Examiner—Lorraine T. Kendell
Attorney, Agent, or Firm—Cushman, Darby & Cushman

[57] ABSTRACT

A molding material structure of a thermoplastic resin composition comprising (1) at least one pillar-shaped body made of a bundle of glass fiber filaments and a non-oriented thermoplastic resin and (2) an outer covering layer of an oriented thermoplastic resin compatible with the resin in said inner body is found to produce molded articles in which glass fiber filaments are dispersed uniformly in the resin matrix with longer average length to improve various properties of molded articles, especially impact strength.

9 Claims, 7 Drawing Figures

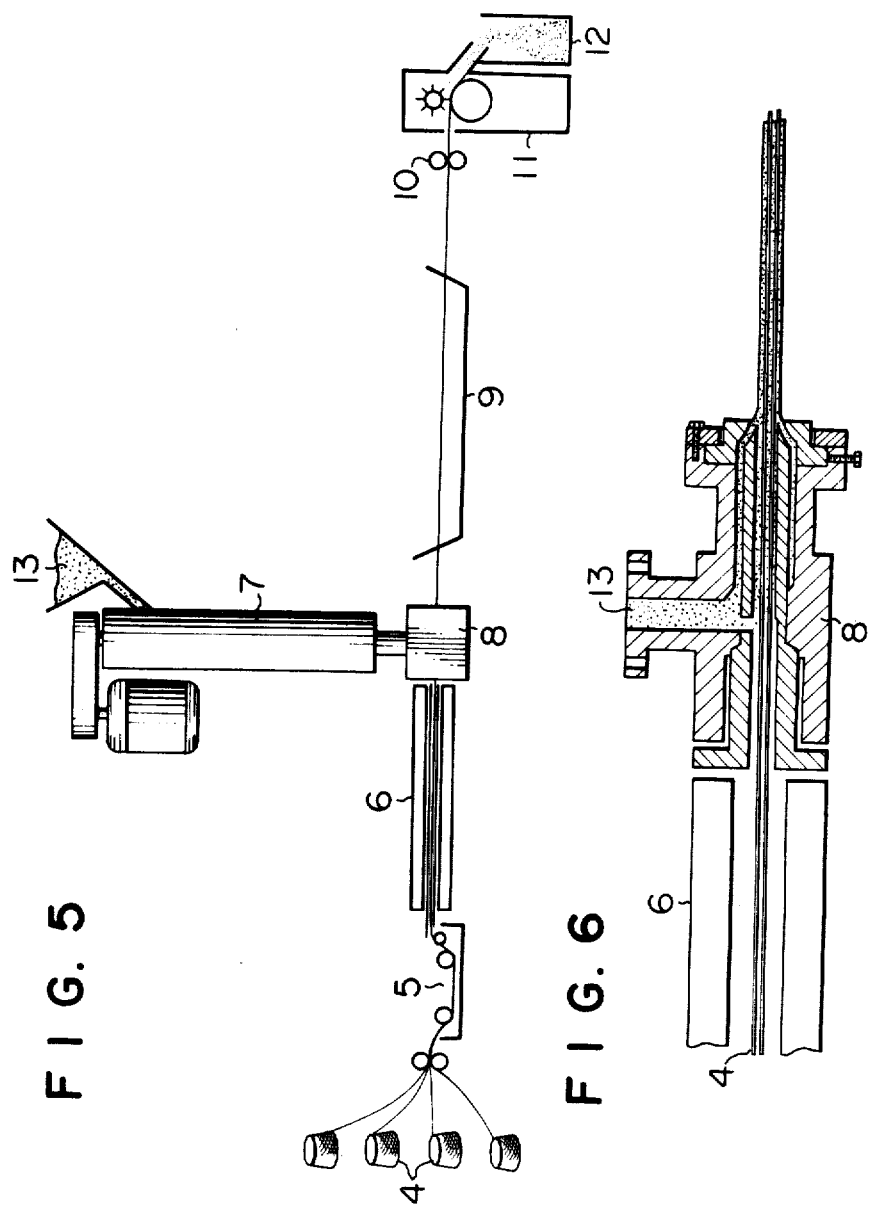

4,169,186

MOLDING MATERIAL STRUCTURE

This invention relates to an improved molding material structure of a thermoplastic resin composition which is capable of producing molded articles in which glass fibers are dispersed uniformly in the resin matrix with longer average fiber length to improve various properties of molded articles, said structure being also improved in processing characteristics and free from such problems as damaging molding machines through frictional abrasion with the glass fibers contained therein.

Molded articles of glass fiber reinforced thermoplastic resins have been used as useful molding materials having excellent physical properties, especially mechanical strength, as well as excellent moldability inherent in thermoplastic resins. Since oil shock in 1973, they have further arrested attention as utilization of the material with higher added value and improvement of their physical properties has been keenly longed for. In prior art, these molded articles have been prepared especially by injection molding from various molding materials. Among them, typical commercially available injection molding material for glass fiber reinforced thermoplastic products is constituted of chopped strands of a glass fiber dispersed in a thermoplastic resin, which is prepared by extrusion of a thermoplastic resin together with glass fibers. Alternatively, another type of molding material having glass fiber core enclosed within a thermoplastic resin as outer coating or shell is also known in the art, as disclosed by U.S. Pat. No. 2,877,501 and U.S. Pat. No. 3,608,033. The molding material of the former type, while it is advantageous in simple and easy preparation procedure, it is entirely impossible to have mono-filaments with longer lengths dispersed uniformly throughout the resin. Thus, this type of molding material can enjoy only limited reinforcing effect with glass fibers inherent within such a structure. On the other hand, in the latter type of molding material, the glass fibers are present as core in the central portion of the material covered with a uni-layer coating of a thermoplastic resin. Consequently, the glass fibers fail to be uniformly dispersed in the resin when fabricated into a molded article. Furthermore, with such a uni-layer coverage of glass fibers, the molding material cannot be free from the problem of damaging mechanical parts at the time of molding because glass fibers exposed by disintegration of outer shell are directly contacted with such mechanical parts.

It is an object of the present invention to provide a molding material of glass fiber reinforced thermoplastic resin which will not cause damaging of molding machines through frictional abrasion and can be molded into an article in which glass fibers with longer length are dispersed uniformly to improve reinforcing characteristics of the thermoplastic resin.

Another object of the present invention is to provide a process for producing a molding material of glass fiber reinforced thermoplastic resin as mentioned above by a simple and safe as well as economical procedure.

Still another object of the present invention is to provide a molded article of glass fiber reinforced thermoplastic resin improved in physical properties, especially mechanical strength.

According to the present invention, there is provided a molding material structure which comprises (1) at least one inner pillar-shaped body, each comprising a bundle of glass fiber filaments and a non-oriented thermoplastic resin, said glass fibers being respectively separated from each other and extending in parallel to each other through the said non-oriented resin and (2) an outer covering layer of an oriented thermoplastic resin which is substantially oriented in the axial direction of said glass fiber filaments and compatible with said non-oriented thermoplastic resin in the inner pillar-shaped body.

Figure 2:
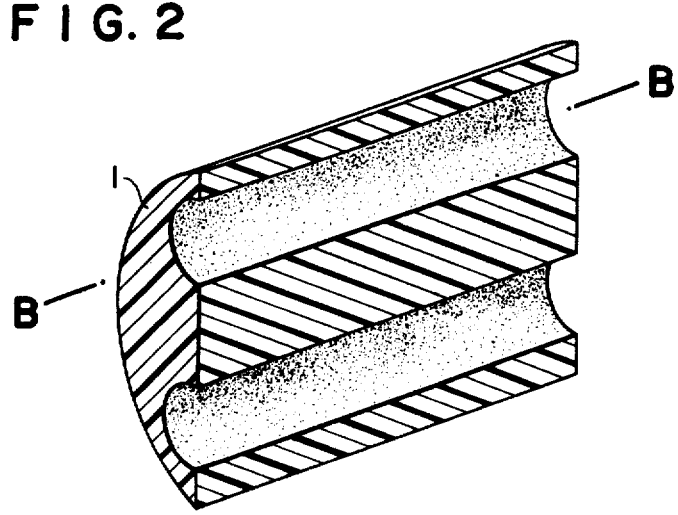
Figure 3:
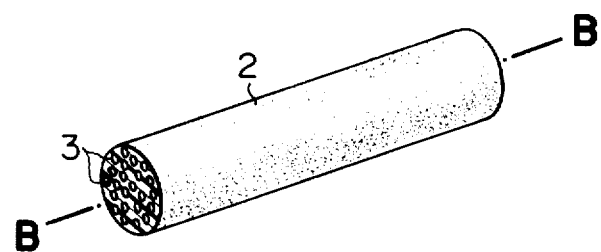

The improved molding material structure of the present invention may be better understood with reference to the accompanying drawings, in which:

FIG. 1 shows cross-sectional view in the vertical direction of one embodiment of the present invention shaped in right cylindrical pellet, in which there are five inner bodies of a thermoplastic resin containing glass fiber filaments embedded in an outer covering layer of thermoplastic resin;

FIG. 2 perspective, partially exploded view of the right cylindrical pellet, of which vertical cross-sectional view is shown in FIG. 1, taken along the line A—A in FIG. 1, showing only the outer covering resin layer portion from which the inner resin bodies containing glass fiber filaments are plucked out;

FIG. 3 perspective view of the inner resin body plucked out from the right cylindrical pellet as shown in FIGS. 1 and 2;

FIG. 4 schematic illustrations of the structures of prior art, indicating the states of fracture thereof;

FIG. 5 a flow sheet, illustrative schematically of the steps of the process for preparation of the molding material structure of the present invention; and FIG. 6 a longitudinal cross-sectional view of one example of a die to be used for preparation of the molding material structure of the present invention.

As shown in FIG. 1, at least one inner resin body 2 containing a large number of mono-filaments 3 are embedded in outer covering resin layer 1. In one aspect, the inner thermoplastic resin body in the present molding material structure is required to be non-oriented, while the outer covering thermoplastic resin layer is substantially oriented. The terms "non-oriented" and "substantially oriented" herein used mean whether there is substantial shrinkage of the resin in a certain direction when measured under conditions as hereinafter specified.

The inner thermoplastic resin body 2 of the present structure contains a large number of monofilaments which extend in parallel to each other through the resin body in the longitudinal direction thereof, as shown in FIG. 3. The resin in the inner body has an interseptal function for separating the filaments from each other so that the resultant molded article may contain uniformly dispersed glass fibers with longer length. Such a structure of the inner body is critical, because glass fibers which are not well separated from each other but contained as a bundle of filaments in the molding material will fail to be uniformly dispersed in the resultant molded article. The filaments 3 in the inner body 2 may be derived conveniently from commercially available glass fiber rovings. Such glass fiber rovings generally consist of from 500 to 20000 end filaments with diameters from 8 to 20 microns. These glass rovings are usually treated with so called sizing compound, typically silicon type coupling agents, during manufacturing steps of glass fibers. Most of the presently available glass fiber rovings contain about 1 wt.% of such a coupling agent, lubricant or sheafing agent. The shape of the inner body is not specifically limited insofar as such a large number of filaments of glass fiber can extend through the resin matrix separately in parallel to each other. While its vertical cross-section is generally ellipsoidal or spherical, it may also be otherwise such as triangular, rectangular or multiangular. The number of such inner bodies may be variable from 1 to 40 or even higher, preferably from 1 to 10 depending on various conditions in the intended uses or preparation methods, but it is most preferably from 1 to 5.

Figure 4A:
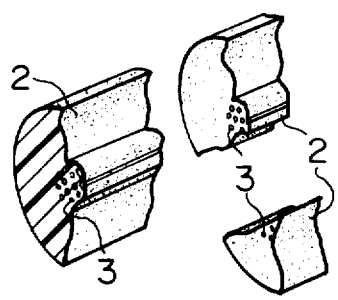
Figure 4B:
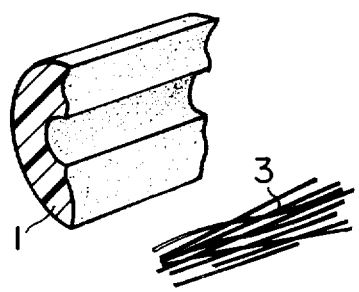

As mentioned above, the outer covering resin layer 1 of the present molding material structure is required to be substantially oriented in the axial direction of the glass fiber filaments contained in the inner resin body as described above. One of the advantage of the molding material structure of the present invention resides in that it causes little damage of mechanical parts during molding operations. While being not bound by any theory, it is believed that such an effect is due to the specific structure of the invention. To speak of injection molding, pellets of a molding material are not still molten in the zone extending from feed zone to compression zone of a screw in an injection or extrusion molding machine but there occurs melting of pellets simultaneously with fracture thereof. Frictional abrasion of metals such as screw or barrel is considered to be due to the friction with glass fiber before the resin containing glass fiber is molten. For example, in case of the blended glass fiber composition of prior art, abrasion in the region from feed zone to compression zone is so great that after a month's operation the injection molding machine may sometimes fail to give favorable molded articles. In other words, at melting, kneading and measuring portions of the screw wherein the thermoplastic resin is sufficiently molten to exhibit excellent lubricating effect, there occurs substantially no abrasion of screw or barrel. The specific structure of the present invention serves to earlier melting of local sections of the thermoplastic resin around the glass fiber. Namely, the outer covering resin layer which is oriented in the axial direction of glass fiber is liable to be readily broken in the oriented direction (longitudinal fracture) through shearing force in the feed zone and compression zone of the screw. As the result of such longitudinal fracture of the outer covering resin, the molding material is separated into the mass of the oriented outer layer and the inner body containing glass fiber filaments enclosed within non-oriented thin layer resin (see FIG. 2 and FIG. 3). Thus, the inner resin body containing glass fiber filaments is removed from the outer covering resin layer and therefore the thin resin portion around the glass fiber is directly heated, without intermediary poorly thermoconductive resin layer, in the screw to be readily molten. In contrast, as shown in FIG. 4(a), when the glass fiber is enclosed within only one nonoriented resin structure, it takes a long time before whole of a thick resin portion around the fiber is molten and therefore the machine suffers from frictional abrasion of screw or barrel; furthermore, the fibers are also broken together with the resin, failing to give molded articles containing glass fibers with long average length. On the other hand, as shown in FIG. 4(b), when a bundle of glass fiber filaments is enclosed only within an oriented resin, the glass fibers are exposed as the result of longitudinal fracture of the oriented resin in the screw to be directly contacted with metals to cause friction.

In the molding material structure according to the present invention, the glass fiber content in the inner thermoplastic resin body is from 5 to 60% by weight based on the total composition, the proportion of the non-oriented resin in the inner body from 0.25 to 18% by weight and the proportion of the oriented resin in the outer covering resin layer from 94.75 to 22% by weight, each being based on the total composition.

In the present invention, the thermoplastic resin to be used for the oriented outer covering resin layer is required to be compatible with the thermoplastic resin to be used for the non-oriented resin body. The word "compatible" herein mentioned means that one resin contains common monomeric units contained in another resin or that there occurs no inter-layer peel-off between one resin and another. The compatibility of typical combinations of the thermoplastic resins for use in the inner layer and outer layer, respectively, are set forth in the following Table 1:

Table 1

|   | PS | AS | ABS | PPE | PE | PP | POM | PC | PA | PMMA | PVC | Ionomer |
|---|----|----|-----|-----|----|----|-----|----|----|------|-----|---------|
| PS | C | | | | | | | | | | | |
| AS | N | C | | | | | | | | | | |
| ABS | N | C | C | | | | | | | | | |
| PPE | C | N | N | C | | | | | | | | |
| PE | N | N | N | N | C | | | | | | | |
| PP | N | N | N | N | C | C | | | | | | |
| POM | N | N | N | N | N | N | C | | | | | |
| PC | N | C | C | C | N | N | N | C | | | | |
| PA | N | N | N | N | N | N | N | N | C | | | |
| PMMA | N | C | C | N | N | N | N | L | N | C | | |
| PVC | N | N | C | N | N | N | N | N | N | C | C | |
| Ionomer | N | N | N | N | C | C | L | N | C | N | N | C |

(note)
C = compatible, L = limitedly compatible, N = non-compatible; PS = polystyrene(including high-impact polystyrene); AS = acrylonitrile-styrene copolymer; ABS = acrylonitrile-butadiene-styrene copolymer(including methyl methacrylate-butadiene-styrene, methyl methacrylate-acrylonitrile-butadiene-styrene and acrylonitrile-butadiene-α-methyl-styrene-styrene copolymers); PPE = polyphenylene ether(including modified PPE); PE = polyethylene; PP = polypropylene; POM = polyoxymethylene; PC = polycarbonate; PA = polyamide; PMMA = polymethyl methacrylate; PVC = polyvinyl chloride The degree of orientation of the outer covering thermoplastic resin layer can easily be judged and tested by compression breaking of the molding material by means of, for example, pincers with muscular strength, etc. to effect longitudinal fracture thereof. By such a test method, the state of fracture in cylinders of a molding machine as mentioned above can easily be visualized. More quantitatively, however, the substantial orientation required for the outer thermoplastic resin layer is defined as having at least 0.5% thermal shrinkage in the axial direction which is observed when the oriented resin, from which the non-oriented glass fiber containing inner layer has been removed, is exposed to heat at a temperature higher by about 45° C. than the Vicat softening point (ASTM-D-1525) of the oriented resin for 30 minutes. Such a degree of orientation can readily be imparted to the resin by extruding a molten resin through an extruder, followed by cooling.

The non-oriented thermoplastic resin in the inner body as described above can generally be derived from an emulsion of a thermoplastic resin. In order to permeate through mono-filaments of glass fiber roving, such an emulsion is required to have affinity with glass fiber and a low viscosity of 100 centi-poise or less. For this purpose, it is preferred to use an aqueous emulsion having small particles of a thermoplastic resin dispersed in water. When glass fiber roving is immersed in such an aqueous emulsion and dried, small particles of the resin are adhered around each mono-filament of the glass fiber. Such small particles of a thermoplastic resin will form, even when molten at a high temperature to be fused with each other, a substantially non-oriented resin matrix.

The resin component in the non-oriented resin matrix is preferred to have a melt flow property (which depends primarily on molecular weight within the same kind of resins) which is the same as or superior to (i.e. smaller in molecular weight than) that of the thermoplastic resin for the outer layer, so that dispersion of glass fibers in injection molded products obtained from the resultant molding material may be good to improve physical properties, e.g. Izod impact strength, by about 10 to 20%.

The molding material structure of the present invention is not particularly limited in its shape but inclusive of all shapes and sizes known in the art as pellets. Preferably, however, it is shaped in cylinders with spherical or ellipsoidal cross-sections vertical to the axial direction of the glass fibers contained therein with shorter diameters ranging from 1 mm to 8 mm and longer diameters ranging from 1 mm to 15 mm, the length of the cylinders being preferably from 1 mm to 20 mm. If desired, other shapes including cylinders with triangular, rectangular, multangular cross-sections may also be employed.

There may be employed various methods for preparation of the molding material structure of the present invention as described above. Referring now to a preferred embodiment of the process according to the present invention as illustrated in FIG. 5 and 6, the process for preparation of the present molding material structure is described in detail below. The process of the present invention comprises first treating at least one glass fiber roving comprising from 500 to 20000 end filaments with an aqueous emulsion of a thermoplastic resin to disperse each filament uniformly in said emulsion, followed by drying, to form an inner thermoplastic resin body containing the glass fiber monofilaments extending therethrough in parallel to each other separated by the thus formed non-oriented, thin interseptal resin and then applying extrusion coating on the thus formed inner layer of another thermoplastic resin which is compatible with said thermoplastic resin for inner body to form an outer covering layer oriented in the direction of extrusion on said non-oriented inner resin body, and pelletizing the glass fiber roving enclosed within double structured layers into suitable size of pellets.

One of the specific features of the process according to the present invention resides in pretreatment of glass fiber roving with an emulsion of a thermoplastic resin which is compatible with the thermoplastic resin to be used for extrusion coating. As mentioned above, commercially available glass fiber roving generally employs a bundle of about 2,000 filaments, each filament being in the order of about 10 microns in diameter. It is almost impossible in principle to coat each element of the filaments by extrusion coating of a highly viscous molten resin which is incompatible with glass fibers. By treating a glass fiber roving which is hydrophilic in nature previously with an aqueous resin emulsion which is low in viscosity, each of the glass fiber filaments can be coated with said resin, thereby improving protection of the glass fibers as well as dispersibility (diffusion) of the glass fibers in the thermoplastic resin.

As shown in FIG. 5, glass fiber roving 4 is led into pre-treatment liquid bath 5 to be immersed therein. The pre-treatment liquid bath 5 is provided for coating an aqueous emulsion of a resin which is of the same kind as or compatible with the thermoplastic resin 13 supplied from the extruder 7. The aqueous resin emulsion is permitted to permeate into the glass fiber roving 4 while it is immersed in and passed through said liquid bath to thereby coating each element of glass fiber mono-filaments with the aqueous resin emulsion to be adhered thereon.

Immersion of the glass fiber roving in said resin emulsion may simply be conducted by passing through said resin emulsion which is contained in a conventional liquid bath. Alternatively, a vibrator such as ultrasonic vibrator is provided in said emulsion liquid bath so as to vibrate the emulsion, whereby the immersion effect (coating adhesion effect) can be complete and production speed can also be accelerated.

The amount of the emulsion to be adhered by coating in the pre-treatment bath may be from 5 to 30 parts by weight as calculated as the resin content adhered after drying said emulsion, preferably 15 to 25 parts by weight, per 100 parts by weight of the emulsion coated glass fiber roving after drying. With an amount of less than 5 parts by weight, the glass fibers cannot completely be dispersed in the thermoplastic resin; while, an amount in excess of 30 parts by weight is difficult to be coated uniformly by once-thru immersion. For coating such a large amount of resin, adhesion by way of several times repeated coating or any other specific device is required. For the purpose of the present invention, no such specific concern is necessary.

The solid component (mainly resin component) in said resin emulsion may be within the range from 30 to 70% by weight as is contained in conventional commercially available emulsions, thus requiring no specific emulsion to be used.

The emulsion coated on the glass fiber roving 4 in the pre-treatment bath 5 is dried by a heater 6. The heater 6 may be any of those utilizing radiant heat such as nichrome wire heater, etc. or those utilizing heated air. Especially, when drying is conducted by use of a far infrared ray heater, utilization efficiency of electricity is good. The internal atmosphere temperature in the heater 6 through which the glass fiber roving 4 is passed may sufficiently be about 100 to 350° C. In case of some latices which are not good in heat-resistance and may cause irregularity through thermal shrinkage at higher temperatures such as SB latex, it is desired to effect drying at 100 to 150° C.

The extruder may be any of conventionally used extruders for thermoplastic resins, so long as it can feed stably a plastified molten resin without output irregularity to a die 8. The extrusion die 8 is provided for the purpose of extrusion coating of the glass fiber roving. It may be a die frequently used for wire coating, etc. But, when five bundles of glass fiber roving are to be included within one pellet, for example, it is preferred to introduce five bundles of the emulsion treated glass fiber roving as described above individually one by one into said die. Furthermore, it is also preferred to have a die structure which enables another coating, namely twice (double) coating, of the five bundles by such a method as sheafing the five bundles at one spot in the die. Double extrusion coating is preferably because glass fiber rovings, which usually consist of a bundle of 500 to 20000 ends of very fine filaments as mentioned above, are liable to be loosened to permit filaments exposed on the surface of the extrusion coated strand (linear body) if only one coating is applied. The glass fibers exposed on the surface may be separated in the subsequent pelletizing step from the resin due to insufficient adhesion to the resin, resulting in unfavorable scattering of such separated glass fibers.

The die structure, which may differ depending on production speed, is preferably such that the internal pressure in the resin may be increased and the pressure beared by the resin extruded may actuate in the direction of alleviating the drawing force imposed on said coated strand. FIG. 6 shows one example of the extrusion coating die for double coating.

The heater 6 and the die 8 should preferably be disposed such that the glass fiber roving dried and heated in the heater 6 may smoothly be introduced into the die 8 without abrupt flection and without too much cooling. For, if a glass fiber roving having 5% or more of the emulsion adhered, which is considerably rigid, is abruptly flexed, there is a fear that it may be broken to cause entanglement thereof at the inlet portion of the die.

The strand having glass fiber cores coated with a thermoplastic resin by the extrusion coating die 8 to a desired glass fiber content is cooled in a cooling water bath 9 to be solidified and wound up by a roll 10. Said strand is pelletized by a pelletizer (cutting machine) 11 to a desired strength. Said pellets are stocked up in a hopper 12 to be provided for use as molding material.

The glass fiber content in the final glass fiber reinforced thermoplastic resin molding material is preferably from 5 to 60% by weight. With a content less than 5% by weight, there is no remarkable effect of reinforcement with glass fibers. On the other hand, a content exceeding 60% by weight will make molding of the material difficult. The amount of the resin to be coated by emulsion treatment is from 0.25 to 18% by weight, while that by extrusion coating from 94.75 to 22% by weight.

The thermoplastic resin to be used for the aqueous emulsion in the first step and that for the extrusion coating may be of the same kind or compatible with each other. These thermoplastic resins are generally selected from those as mentioned in Table 1. Preferable classes of combinations of these resins to be widely used in commercial application are set forth in Table 2 below.

Table 2

| Class | Oriented resin (formed by extrusion coating) | Non-oriented resin (formed from aqueous emulsion) |
|---|---|---|
| 1 | Polystyrene(including rubber-modified high-impact polystyrene) | Polystyrene resin or Styrene-butadiene resin |

Table 2-continued

| Class | Oriented resin (formed by extrusion coating) | Non-oriented resin (formed from aqueous emulsion) |
|---|---|---|
| 2 | Acrylonitrile-styrene resin | Acrylonitrile-styrene resin; or a copolymer of styrene with at least one monomer selected from the group consisting of acrylonitrile, acrylic acid(derivative) and methacrylic acid (derivative) |
| 3 | Acrylonitrile-butadiene-styrene resin; Methyl methacrylate-acrylonitrile-styrene-butadiene resin; Methyl methacrylate-styrene-butadiene resin; or Acrylonitrile-butadiene-α-methyl styrene-styrene resin | The same resin as in Class 2; or a resin of the same kind as the oriented resin |
| 4 | Polyphenylene ether or modified polyphenylene ether | Polyphenylene ether, modified polyphenylene ether or polystyrene resin |
| 5 | Polyethylene or polypropylene | Polyethylene, polypropylene, ethylene-vinyl acetate copolymer or ethylene-methacrylic acid copolymer resin |

The thermoplastic resins as mentioned above to be used in the present invention have generally the melt-flow rates as shown in Table 3 below, which are measured by ISO-R1133-1969 "Determination of the Melt Flow Rate of Thermoplastics" or a method similar thereto under conditions as given in the same Table.

Table 3

| Thermoplastic resin | MFR measurement conditions (temperature, load) | The range of MFR value | Remarks |
|---|---|---|---|
| Polystyrene | 200° C., 5 kg (procedure 8) | 1-100 | Rubber modified polystyrene being included |
| Acrylonitrile-styrene | 220° C., 10 kg | 1-100 | Acrylonitrile/styrene= 5/95-70/30 |
| ABS type resin | 220° C., 10 kg | 1-100 | |
| PPE | 250° C., 10 kg | 1-100 | Modified PPE being Included |
| PE | 190° C., 2.16 kg (procedure 4) | 0.03-100 | |
| PP | 230° C., 2.16 kg (procedure 12) | 0.1-100 | |

In the following Table 4, there are shown the physical properties of the injection molded test pieces prepared from the molding material of the present invention utilizing AS resin as thermoplastic resin as obtained by the procedure as described in the following Example 1, as compared with those prepared by the methods of prior art, namely by blending chopped strands of glass fiber with molten AS resin (reference example 1), by applying only emulsion coating of AS resin on glass fiber roving (reference example 2), by applying only extrusion coating of AS resin on glass fiber roving (reference example 3) and by first applying a solution coating of AS resin dissolved in methyl ethyl ketone on glass fiber roving, followed by extrusion coating of AS resin (reference example 4), using the same AS resins, respectively.

ture are also found to be extremely improved. It is believed that such improvements in physical properties can be ascribed to uniform dispersion of glass fiber filaments and longer average glass fiber length in the thermoplastic resin of the injection molded article produced from the pellet of the present invention. Furthermore, the injection molded article prepared from the present molding material has physical properties superior to those prepared from any other material known in the art, and the injection molding machine can be free Table 4

| | AS resin | Reference example 1 | Reference example 2 | Reference example 3 | Reference example 4 | Example 1 |
|---|---|---|---|---|---|---|
| Pre-treatment of glass fiber | None | None | AS emulsion treatment alone | None | AS 20% MEK solution | AS emulsion treatment |
| Glass fiber content in pellet (%; solvent separation method) | 0 | 20 | 20 | 20 | 20 | 20 |
| Tensile strength (Kg/cm$^2$; JIS K6871) | 730 | 1100 | 1100 | 800 | 850 | 1200 |
| Elongation (%; JIS K6871) | 2 | 2 | 2 | 2 | 2 | 2 |
| Flexural strength (Kg/cm$^2$; ASTM D790) | 1070 | 1500 | 1400 | 1400 | 1300 | 1640 |
| Flexural modulus (Kg/cm$^2$; ASTM D790) | 35000 | 70000 | 62000 | 60000 | 55000 | 73000 |
| Izod impact strength (Kg cm/cm; JIS K6871) | 1.5 | 5.0 | 7 | 5–13 (greatly fluctuated) | 5–11 (greatly fluctuated) | 11 |
| Heat distortion temperature (C; JIS K6871) | 70 | 99 | 99 | 95 | 98 | 102 |
| Dispersion of glass fibers (visible observation of injection molded plate) | — | good | | basd | bad(insufficient glass fiber dispersion) | good |
| Average glass fiber length in the molded article (microscopic observation of glass fibers separated by solvent) | — | 0.4 mm | 0.75mm | unmeasurable due to the presence of glass fiber balls | unmeasurable due to the presence of glass fiber balls | 1.2 mm |
| Abrasion of injection molding machine (visible observation after half year operation) | None | abraded | abraded | — | — | None |

As apparently seen from Table 4, the glass fiber reinforced thermoplastic resin molding composition of the present invention can produce injection molded articles having excellent physical properties, being superior over commercially available glass fiber reinforced AS resin (reference example 1) in impact strength (Izod impact strength) by as much as twice, and also remarkably in heat-resistance (heat distortion temperature). Furthermore, creep characteristics at a high temperafrom abrasion by use of the molding material of the present invention.

The present invention is further illustrated by the following Examples and Comparison example.

EXAMPLE 1

Four bundles of glass fibers (2000 end, 13 $\mu\phi$ filaments in one bundle) are immersed in a AS resin (AN=25%, M.F.R.=5 g/10 min.) emulsion with 50% solid components. The bundles subjected to coating treatment with said emulsion are dried under an atmosphere at 200° C. After drying, the AS resin coated roving contains 80 parts by weight of glass fibers and 20 parts by weight of AS resin.

AS resin is extruded through an extruder maintained at a barrel temperature of 160° to 180° C. on the hopper side and 200° to 220° C. on the outflowing side and a die temperature of 220° C. at the rate of 12 kg/hour and supplied to the die. Winding speed of the emulsion treated glass fiber bundle obtained above is controlled at 20 m/min., with the diameter of the extrusion coated strand being 3.8 mm$\phi$ and only one strand being wound up. This strand is cut into pellets with 3.5 mm length by a pelletizer. The pellet obtained contains 20 wt. % of glass fibers, 4 wt. % of non-oriented AS resin and 76 wt. % of oriented AS resin. The degree of orientation of the oriented AS resin is measured at 160° C. by the method as described above to be 1% shrinkage. The pellet can be readily broken with pincers to be separated into broken pieces of oriented resin and broken pieces of non-oriented resin containing glass fibers. This pellet is molded by conventional injection molding to obtain an article having physical properties as shown in Table 4. In addition to the excellent physical properties as mentioned above, the dispersion of the glass fibers in the molded article is found to be good without agglomeration (balls) of glass fibers. Further, comparison is made about the melt flow property between the AS resin obtained by salting out the AS emulsion used in this Example and the AS resin supplied from the extruder. That is, melt flow properties of these resins are measured by, for example, Melt Flow Rate measuring device as determined in ISO R1133 under the condition of 220° C., 10 Kg load to give the same result of 5 g/10 min.

EXAMPLE 2

Example 1 is repeated using an AS resin emulsion of which AS resin after salting out has a melt flow rate of 10 g/10 min. and an AS resin with a melt flow rate of 5 g/10 min. to be supplied from the extruder, under otherwise the same conditions as in Example 1, to prepare a pellet with strand diameter of 3.8 mm$\phi$ and length of 3.5 mm. By injection molding the resultant pellet by conventional method, there is obtained a molded article which is better in uniformity of the glass fibers dispersed in the molded article as well as surface appearance improved in flatness and gloss. The melt flow property (injection molding pressure) is also slightly (by about 10% decrease) improved. As to the physical properties, Izod impact strength is slightly improved to be 13 kg.cm/cm as compared with Example 1, other properties being comparable to those of Example 1.

EXAMPLE 3

Four bundles of a glass fiber (2000 end, 15$\mu\phi$ monofilaments in one bundle) are immersed in a styrene-butadiene resin (St/Bd=6/4) emulsion (solid components: 45%) and dried at 110° C. The emulsion coated bundles after drying contains 85 parts by weight of glass fibers and 15 parts by weight of styrene-butadiene resin. A polystyrene resin is extruded through an extruder maintained at a barrel temperature of 160° to 180° C. on the hopper side and 200° to 220° C. on the outlet side and a die temperature of 220° C. and supplied to an extrusion coating die. The glass fiber is wound up at a speed of 5 m/min. with extruded strand diameter being 3.2 mm$\phi$. Said strand is cut into pellets of 5 mm length. Said pellets contain 30 wt.% of the glass fibers, 5.3 wt.% of non-oriented SB resin and 64.7 wt.% of oriented PS resin. When injection molding of the pellets is performed by conventional method, the dispersion of the glass fibers is found to be good to give an injection molded article having improved physical properties. The styrene-butadiene resin used in this Example has a melt flow rate of 10 g/10 min. and the polystyrene of 3 g/10 min. (measured under the conditions of ISO-R1133, procedure 8).

EXAMPLE 4

Three bundles of glass fiber (each bundle comprising 2000 end filaments with diameters of 13$\mu$) are immersed in an aqueous polystyrene resin emulsion with solid content of 40% to apply coating treatment on each roving, followed by drying in an atmosphere maintained at 200° C. The composition of the roving coated with polystyrene resin after drying consists of 85 parts by weight of glass fiber and 15 parts by weight of polystyrene resin. A mixture of polyphenylene ether resin and polystyrene resin (PPE/PS=4/6, M.F.R.=7 g/10 min.) is extruded through an extruder at cylinder temperature and die temperature of 270° C., respectively at the rate of 75 kg/hour to be fed into the die. On the other hand, winding speed of the glass fiber roving as prepared above is controlled at 20 m/minute with diameter of extrusion coated strand of 3.2 mm, five strands being wound up at one time. The resultant strand is cut into pellets by a pelletizer. Glass fiber content in this pellet is found to be 20 wt.%. This pellet is injection molded by conventional method to obtain a molded article having Izod impact strength of 20 kg.cm/cm and a heat distortion temperature of 145° C. For comparative purpose, there are prepared pellets of a mixture of the polyphenylene ether mixture with 20% of glass fiber prepared by blending glass fiber with the polyphenylene ether mixture in an extruder, both being of the same kind as used in the above Example. The pellets are similarly injection molded to obtain an article having an Izod impact strength of 10 kg.cm/cm and a heat distortion temperature of 140° C. From this comparison, the improved effect of the present invention can be apparently seen and the glass fibers in the molded article of the present invention are found to be well dispersed therein without agglomeration (balls) of glass fibers, exhibiting a good appearance.

EXAMPLE 5

Example 1 is repeated except that an aqueous emulsion (solid: 50%) of ethylene-vinyl acetate copolymer (vinyl acetate: 28%) is used in place of the AS emulsion, and a high density polyethylene (density=0.950, MI=3 g/10 min) in place of the AS resin for the extrusion coated outer covering layer resin. The resultant molding material produces a molded article improved in mechanical properties to the same extent as observed in Example 1. Comparison example In substantially the same step as in Example 1, in place of the AS resin emulsion, there is prepared a 20 wt. % AS resin solution by dissolving an AS resin with substantially the same molecular weight as that contained in the AS emulsion in methyl ethyl ketone. The same glass roving as used in Example 1 is immersed in said AS resin solution, followed by drying. The roving after drying contains 20% by weight of AS resin adhered thereon. Under the same conditions as in Example 1, the AS resin is extrusion coated on this roving to a final glass fiber content of 20% by weight, followed by pelletizing. The pellets obtained are injection molded to obtain an injection molded article, in which glass fibers are insufficiently dispersed. The injection molded articles have various fluctuations in physical properties, especially Izod impact strength. While there may be considered various factors which will affect physical properties of the molded product such as viscosity of the AS resin methyl ethyl ketone solution, penetration degree of the resin solution into the roving and balance in amounts of the coating or adhesion of the resin on the roving, it is believed that the insufficient dispersion of the glass fibers in the final molded product is ascribable to still insufficient affinity between the glass fibers and methyl ethyl ketone due to which no complete coating can be applied previously on the glass fibers.

As described above, the molding material of the glass fiber reinforced thermoplastic resin of the present invention is a molding material which is very excellent in glass fiber reinforcing effect. For molding the material of the present invention, there can be used various molding machines known in the art such as injection molding machine or an extruder and the material can be used as it is when applying these machines. Due to uniform dispersion of the glass fibers in the material of the present invention, it can produce molded articles with excellent physical properties and surface appearance of good smoothness and gloss. Furthermore, the oriented outer resin is readily broken in a molding machine and the non-oriented resin present as thin film layer around glass fibers (an easily be molten to effect lubricating action between glass fibers and metals in molding machines, whereby abrasion of machines is very small. Thus, a variety of uses will be expected of the material provided by the present invention.

What we claim is:

1. A thermoplastic resin pellet having a length of 1 to 20 mm and suitable for manufacture of molded articles which consists essentially of:
    (1) at least one inner pillar-shaped body, each comprising a bundle of glass fiber filaments embedded in a non-oriented thermoplastic resin, said glass fibers being respectively separated from each other and extending in parallel to each other through the said non-oriented resin and
    (2) an outer covering layer devoid of glass fiber filaments and made of an oriented thermoplastic resin which is substantially oriented in the axial direction of said glass fiber filaments and compatible with said non-oriented thermoplastic resin in the inner pillar-shaped body, the glass fiber content in the composition being from 5 to 60% by weight, the proportion of the thermoplastic resin in the inner body being from 0.25 to 18% by weight and the thermoplastic resin in the outer layer being from 94.75 to 22% by weight, all proportions being based on the total composition.

2. A pellet of a thermoplastic resin composition as in claim 1, wherein the thermoplastic resin for the outer layer is selected from the group consisting of polystyrene and rubber-modified high-impact polystyrene and that for the inner body from the group consisting of polystyrene and styrene-butadiene copolymer.

3. A pellet as in claim 1, wherein the thermoplastic resin for the outer layer is selected from the group consisting of acrylonitrile-styrene copolymer and that for the inner body from the group consisting of acrylonitrile-styrene copolymer and copolymers of styrene with at least one monomer selected from the group consisting of acrylonitrile, acrylic acid and its derivative, and methacrylic acid and its derivative.

4. A pellet as in claim 1, wherein the thermoplastic resin for the outer layer is selected from the group consisting of acrylonitrile-butadiene-styrene copolymer, methyl methacrylate-acrylonitrile-styrene-butadiene copolymer, methyl methacrylate-styrene-butadiene copolymer and acrylonitrile-butadiene-α-methyl styrene-styrene copolymer and that for the inner body from the group consisting of acrylonitrile-butadiene-styrene copolymer, methyl methacrylate-acrylonitrile-styrene-butadiene copolymer, methyl methacrylate-styrene-butadiene copolymer, acrylonitrile-butadiene-α-methyl styrene-styrene copolymer, acrylonitrile-styrene copolymer, and copolymers of styrene with at least one monomer selected from the group consisting of acrylonitrile, acrylic acid and its derivative, and methacrylic acid and its derivative.

5. A pellet as in claim 1, wherein the thermoplastic resin for the outer layer is from the group consisting of polyphenylene ether and modified polyphenylene ether and that for the inner body from the group consisting of polyphenylene ether, modified polyphenylene ether and polystyrene.

6. A pellet as in claim 1, wherein the thermoplastic resin for the outer layer is selected from the group consisting of polyethylene and polypropylene and that for the inner body from the group consisting of polyethylene, polypropylene, ethylene-vinyl acetate copolymer and ethylenic ionomer.

7. A pellet as in claim 1, wherein the thermoplastic resin for the outer layer and that for the inner body are of the same kind of a thermoplastic resin.

8. A pellet as in claim 1, wherein the thermoplastic resin for the outer layer has a melt flow rate not higher than that for the inner body.

9. A pellet according to claim 1 wherein the glass fiber bundle contains 500 to 2000 filaments.

* * * * *